Dec. 29, 1970   G. J. CROCKER ET AL   3,551,391
MODIFIED ACRYLATE ADHESIVE PRODUCT
Filed Dec. 9, 1968
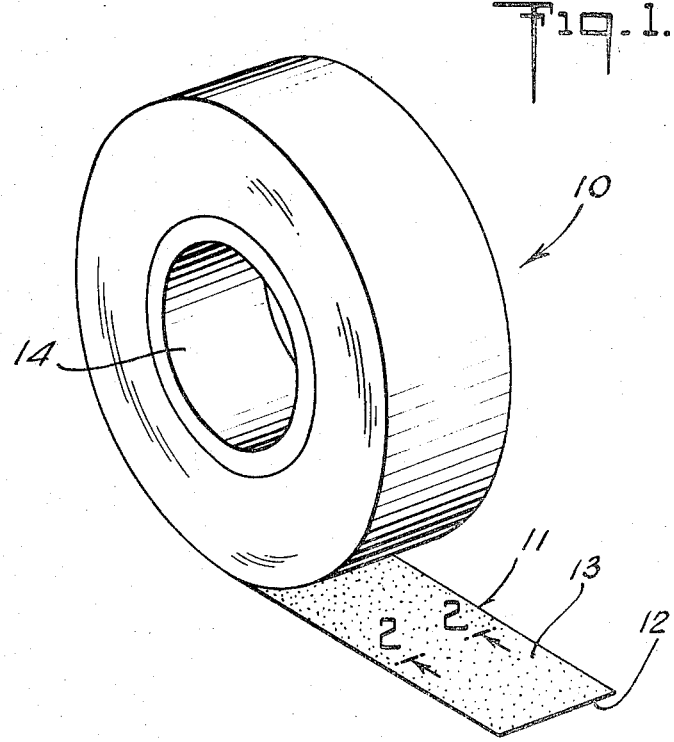
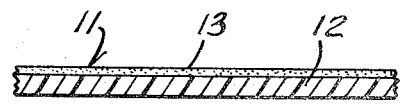
INVENTORS:
GUY J. CROCKER
DONALD F. DOEHNERT
BY
Charles A. Harris
ATTORNEY.

United States Patent Office 3,551,391
Patented Dec. 29, 1970

---

3,551,391
MODIFIED ACRYLATE ADHESIVE PRODUCT
Guy J. Crocker, North Brunswick, and Donald F. Doehnert, Millington, N.J., assignors to Johnson & Johnson, a corporation of New Jersey
Filed Dec. 9, 1968, Ser. No. 782,298
Int. Cl. C08f 27/00, 15/40, 37/06
U.S. Cl. 260—78.5          17 Claims

ABSTRACT OF THE DISCLOSURE

Acrylate pressure-sensitive adhesive products based on an adhesive copolymer of monomers comprising a major amount of a medium chain length alkyl acrylate monomer, preferably a minor amount of a cohesion inducing short chain monomer, and about 0.5–5.0 parts by weight of the total monomer solids, preferably about 1–3 parts of the total monomers, of maleic anhydride; to which is added a small amount, preferably about 0.02–0.5 part of amine nitrogen by weight of the total monomer solids of a ring-opening amine modifier preferably containing no more than one functional group selected from the class consisting of primary amine groups, secondary amine groups and hydroxyl groups. The monomers are copolymerized in a suitable organic solvent to form a stable copolymer solution, and the amine modifier is added subsequent to polymerization. A small amount of a polymerizable cross-linking monomer, such as an alkoxy silyl cross-linking monomer, may be copolymerized with the other monomers when it is desired to permanently cross-link the adhesive either with or without the addition of a suitable cross-linking catalyst.

---

The present invention relates to pressure-sensitive adhesive sheets and tapes and pressure-sensitive adhesives therefor and more particularly to pressure-sensitive acrylate adhesive products.

Pressure-sensitive adhesives based upon acrylate copolymers are well known for their many fine qualities, principally for their ability to provide the desired tack without the addition of a tackifying resin and for their clarity. However, these adhesives suffer from undesirable flow under low shear stresses. Various proposals have been made for cross-linking acrylate adhesives to increase their resistance to heat, solvents, and improved their resistance to flow. However, these often have resulted in adhesives which are difficult if not impossible to coat except at low solids and products which lack the other properties, such as tack, which are necessary in a pressure-sensitive adhesive.

We have invented a novel acrylate pressure-sensitive adhesive product which possesses excellent hold and resistance to shear as well as the desired balance of tack, cohesive strength and other properties which are so difficult to obtain in adhesives of this type. We have discovered that we can sharply improve the holding ability and obtain the desired balance of adhesive properties of acrylate adhesive copolymers of this invention by adding a particular type of amine modifier to decrease their plastic flow, i.e., increase their Williams plasticity, and that the desired performance characteristics of adhesive products according to this invention are closely related to the plasticity of the adhesive. We have determined that the dried adhesive according to this invention should have a Williams plasticity of about 1.8–3.0 for best results, although adhesives having somewhat higher and lower Williams plasticities also may be used to contribute the desired balance of physical properties to the resulting adhesive product.

The pressure-sensitive adhesive product of this invention is based upon an adhesive copolymer of monomers which comprise a major amount of a relatively soft medium chain length alkyl acrylate monomer and preferably a minor amount of a cohesion and hardness inducing short chain monomer, and about 0.5–5.0 parts by weight of the total monomer solids, preferably about 1–3 parts, of maleic anhydride; to which is added a small amount, preferably about 0.02–0.5 part of amine nitrogen by weight of the total monomer solids, of a ring-opening amine modifier selected from the group comprising ammonia, monoamines and polyamines, and preferably containing no more than one functional group selected from the class consisting of primary amine groups, secondary amine groups and hydroxyl groups. When the term "parts" is used above and hereafter in this application, it shall means parts per 100 parts by weight of the total monomer solids from which the adhesive copolymer is polymerized, unless otherwise indicated.

The monomers are mixed and copolymerized in a suitable organic solvent to form a stable adhesive copolymer solution, and the amine modifier is added at the end of, or subsequent to, the polymerization step. A small amount of a polymerizable cross-linking monomer, such as an alkoxy silyl cross-linking monomer, may be copolymerized with the other monomers when it is desired to permanently cross-link the adhesive either with or without the addition of a suitable cross-linking catalyst.

The preferred amine modifiers of this invention include ammonia which normally is added in the form of ammonium hydroxide; primary, secondary, and tertiary monoamines such as ethoxyethylamine, 2-ethylhexyl amine, t-octylamine, diisopropyl amine, diethoxyethylamine, di (2-ethylhexyl) amine, and N,N-dimethylaniline; and primary, secondary and tertiary polyamines such as dimethylaminopropylamine, N,N,N',N' - tetramethyl-1,3 butanediamine and hexamethylene tetramine; and the like. Excellent results are obtained with ammonia added as ammonium hydroxide either at the end of the polymerization step or at any time prior to coating.

The relatively soft medium chain length alkyl acrylate monomers of this invention generally are those averaging about 4–12 carbon atoms in the alcohol moiety and include, butyl, hexyl, 2 ethylhexyl, octyl, decyl, and dodecyl acrylates, and the like, alone or copolymerized with one another or with higher and lower alkyl acrylates. This soft acrylate monomer is present in the adhesive copolymer of this invention in a major amount by weight of the copolymer, preferably in the amount of about 50–85 parts by weight of the copolymer.

The cohesion inducing short chain monomers of this invention normally are present in the adhesive copolymer in the amount of about 5–30 parts, preferably above about 10 parts, and generally are selected from vinyl acetate, methyl acrylate, methyl methacrylate, short chain acrylamides and methacrylamides, and the like. Diacetone acrylamide and N-tertiarybutyl acrylamide are examples of short chain acrylamides which may be used for this purpose. Preferably, no more than about 20 parts acrylamide are used, and when a mixture of acrylamide with another short chain monomer selected from vinyl acetate, methyl acrylate, and methyl methacrylate is employed, 2–7 parts of the acrylamide are preferred.

The polymerizable cross-linking monomer preferably is an alkoxy silyl cross-linking monomer prepared as described in United States patent application Ser. No. 399,837 filed Sept. 28, 1964, and comprises an alkoxy silyl alkyl group and an unsaturated functional terminal group copolymerizable with the other monomers. This functional terminal group preferably is an acrylate or substituted acrylate group such as

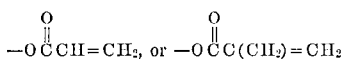

The polymerizable cross-linking alkoxy silyl alkyl groups found to be particularly effective are those having the general formula

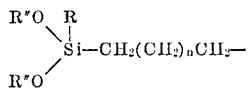

where R' and R'' are either $CH_3-$ or $CH_3CH_2-$ and R is one of the group consisting of $CH_3-$, $CH_3CH_2$, $CH_3O-$ and $CH_3CH_2O-$, and $n$ is a number of 0 through 8. A preferred silyl cross-linking monomer is 3-meshacryloxypropyltrimethoxysilane, i.e.,

The amount of the silyl cross-linking monomer to be included in preparing the copolymer depends on the exact constituents of the copolymer and the degree of cross-linking desired. Very small amounts are found to be effective. For instance, the silyl cross-linking monomer may be included in amounts of about 0.005 to 0.4 part by weight of the copolymer with about 0.01 part being preferred.

The adhesive copolymer composition of this invention preferably is produced by mixing the monomers in the desired proportions to form a monomer mix and then polymerizing the mixture in a suitable organic solvent, such as ethyl acetate, isopropyl acetate, acetone, cyclohexane, tertiary-butyl alcohol, or the like, alone or mixed with one another, utilizing a suitable catalyst, such as benzoyl peroxide, for the polymerization reaction. As indicated hereinbefore, the amine modifier is added at any time after the polymerization is completed. When the adhesive copolymer includes cross-linking groups, the cross-linking catalyst preferably is added just prior to coating and the adhesive then is cross-linked in situ on the substrate. The cross-linking catalyst preferably is of the organo-metallic salt type such as the organo-metallic salts of lead or tin illustrated by lead octoate, dibutyltin bis 2-ethylhexoate, dibutyltin laureate, etc. However, strong acid catalysts such as paratoluene sulfonic acid and others, also may be used for this purpose. The catalyst may be added to the adhesive solution in the amount of about 0.005–1.0 part by weight of the adhesive copolymer. After the catalyst is added, cross-linking may be effected very quickly, say in about 5 minutes, by passing the adhesive product through an air circulating oven at about 200–210° F.

Other and further advantages of this invention will appear to one skilled in the art from the following description and claims, wherein:

FIG. 1 is a view in perspective of a roll of tape according to one embodiment of the invention, and FIG. 2 is a greatly enlarged fragmental sectional view taken along the line 2—2 of FIG. 1.

Referring to the drawings, there is shown a roll 10 of pressure-sensitive adhesive tape 11, according to one embodiment of this invention, which comprises a flexible backing sheet 12 and a layer 13 of pressure-sensitive adhesive composition according to this invention coated on one major surface of said backing. The tape 11 normally is wound upon itself around a core 14 with the adhesive side of the tape facing inwardly toward the core. The backing sheet 12 may be a plastic film, paper, or any other suitable backing material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts by weight of the total adhesive monomer solids unless otherwise indicated.

EXAMPLE I

A three-liter, three-necked flask is set up with a water condenser, a mechanical stirrer, a thermometer, and a gas inlet tube. The flask is placed in a water bath which is heated electrically. To the flask is added 75 parts of 2-ethylhexylacrylate, 22 parts of vinyl acetate, 3 parts of maleic anhydride, 50 parts of acetone, 50 parts of ethyl acetate, and 0.3 part of benzoyl peroxide. The reaction mixture is heated to a temperature of 75° C. while the air in the flask is displaced with a slow stream of nitrogen. The nitrogen flushing is then discontinued and a vigorous exothermic polymerization ensues which lasts for about one-half hour. Stirring and heating at 65–70° C. is continued for one hour. Then, 0.5 part of benzoyl peroxide dissolved in 36 parts of ethyl acetate is slowly added over three hours to reduce the solution viscosity and to obtain more complete polymerization. After four additional hours of continuous gentle reflux, the reaction is then discontinued and the solution copolymer is cooled to provide a control adhesive solution having a solids content of 45%.

The control adhesive is coated onto a 1.5 mil film of polyethylene terephthalate and heated for five minutes in an air circulating oven at 210° F. to give a mass deposit of about 1.0 oz. per square yard. The coated film is then slit into tapes and wound upon itself in the form of rolls. The adhesive layer of this control tape has a relatively low Williams plasticity of 1.47 mm. and a correspondingly low 20° hold to chrome of 25 minutes, along with an adhesion to steel of 36 oz. per inch of width and a quick stick of 2.5.

The control adhesive solution then is made into an adhesive of this invention by the addition of 0.5 part ammonium hydroxide as a 28% ammonia solution containing about 0.115 part of amine nitrogen, coated on the same backing film and made into tapes of this invention as described above for the control tapes. The resulting adhesive layer possesses a sharply increased Williams plasticity of 2.6 mm. and a 20° hold to chrome of 250 minutes (a ten-fold increase) as well as excellent shear resistance. The resulting adhesion to steel of 34 oz. per inch of width and quick stick of 1.5 are well within the desired balance of physical properties.

In the following Table A of examples the adhesive formulations indicated are copolymerized and made into tapes as in Example I and then tested, with the following results.

TABLE A

| Example | II | III | IV | V | VI | VII | VIII |
|---|---|---|---|---|---|---|---|
| 2-ethylhexyl acrylate, parts | 75 | 75 | 75 | 75 | 75 | 75 | 75 |
| Vinyl acetate, parts | 22 | 22 | 22 | 18 | 18 | 18 | 22 |
| Diacetone acrylamide, parts | | | | 5 | 5 | 5 | |
| Maleic anhydride, parts | 3 | 3 | 3 | 2 | 2 | 2 | 3 |
| 3-methacryloxypropyltrimethoxysilane, parts (cross-linking monomer) | | | | 0.05 | 0.05 | 0.05 | 0.05 |
| $NH_3$, as parts ammonium hydroxide solution containing 28% $NH_3$ | | | | 0.3 | 0.5 | | 0.5 |
| Diisopropyl amine, parts | 0.5 | | | | | 0.3 | |
| Ethoxyethylamine, parts | | | 0.5 | | | | |
| N,N,N',N' tetramethyl-1-,3-butanediamine, parts | | 0.5 | | | | | |
| Amine-nitrogen, parts | 0.07 | 0.09 | 0.08 | 0.07 | 0.115 | 0.04 | 0.115 |
| Williams plasticity (after oven) | 2.5 | 2.84 | 2.13 | 2.77 | 3.0 | 2.46 | 2.84 |
| Adhesion, oz./in. width | 41 | 34 | 32 | 35 | 38 | 38 | 30 |
| Quick stick | 0.8 | 0.4 | 1.0 | 1.4 | 0.5 | 1.4 | 0.9 |
| 20° hold to chrome, mins. (75° F.) | 1,440+ | 1,440+ | 90 | 300 | 250 | 300 | 700 |

All of the above tapes exhibit relatively high adhesive plasticities with correspondingly high hold values and with adhesion and quick stick within the desired range of physical properties, whether or not the cross-linking monomer is included in the formulation. Thus, the presence of the ammonia or amine of this invention in the formulation has the effect of raising the Williams plasticity of the adhesive so that the resulting tape clearly possesses the desired balance of properties whether or not the adhesive is cross-linked. However, if it is desired that the tapes retain their properties when subjected to solvents or high temperatures, it is preferred that a small amount of the cross-linking monomer be included, as indicated in Examples V–VIII, and as described hereinbefore.

The properties of the adhesive products of this invention are determined in the foregoing examples by the following tests.

Adhesive strength or peel adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC–1 of the Pressure-Sensitive Tape Council.

Quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball is plastic and approximately 1.5 inches in diameter, and weighs approximately 2 grams. Its outer surface is carefully cleaned between each test.

Hold to chrome is measured in terms of the time taken to strip a specified tape sample from a one-half (½) inch by one-half (½) inch chrome-plated surface by attaching a 400 gram weight to the bottom end of the tape when the surface is disposed at 20° to the vertical and the tape is hanging at an angle of 20° to the adjacent portion of the chrome-plated surface from which it is being removed.

Williams plasticity is determined as follows. A wet film of the solution adhesive is coated on silicone release paper so as to produce a dry film approximately 1½ mils in thickness. It is dried five minutes at 195–200° F. in a circulating air oven. The adhesive is removed from the silicone paper and a pellet exactly 2 grams in weight is formed in the shape of a ball. The sample ball is placed between two plasticity papers and conditioned for 15 minutes at 100° F. The plasticity papers consist of papers with a highly glossy clay coated surface facing the plasticity pellet. The Williams plasticity is the thickness of the pellet in mm. after 15 minutes compression at 100° F. in the plastometer under a 5 kg. load.

The desired balance of pressure-sensitive adhesive properties according to this invention is best achieved with a peel adhesion of at least about 25 ounces per inch of width, a quick stick of at least about 0.4 or 0.5, preferably above 1, and a hold to chrome of at least about 1 hour.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A normally tacky and pressure-sensitive sheet which comprises a thin flexible backing member and a pressure-sensitive adhesive composition coated on one major surface thereof; said composition comprising a copolymer of monomers comprising:
   (a) a major amount by weight of the copolymer of a medium chain length alkyl acrylate monomer wherein the alcohol moiety comprises an average of about 4–12 carbon atoms, and
   (b) about 0.5–5.0 parts of maleic anhydride; and about 0.02–0.5 part of amine nitrogen of a ring-opening amine modifier selected from the group consisting of ammonia, monoamines and polyamines said amine modifier being added to the composition after the copolymerization of monomers (a) and (b), said parts being parts per 100 parts by weight of total monomer (a) and (b) solids.

2. A pressure-sensitive adhesive sheet according to claim 1, wherein said monomers include about 5–30 parts per 100 parts by weight of said monomer solids of a cohesion inducing short chain monomer copolymerizable with the other monomers.

3. A pressure-sensitive adhesive sheet according to claim 2, wherein said cohesion inducing short chain monomer is selected from the group consisting of vinyl acetate, methyl acrylate, methyl methacrylate, and short chain acrylamides.

4. A pressure-sensitive adhesive sheet according to claim 3, wherein said cohesion inducing short chain monomer is vinyl acetate.

5. A pressure-sensitive adhesive sheet according to claim 1, wherein said amine modifier contains no more than one functional group selected from the class consisting of primary amine groups, secondary amine groups and hydroxyl groups.

6. A pressure-sensitive adhesive sheet according to claim 1, wherein said monomers include a small amount of a cross-linking monomer having an unsaturated functional terminal group which is copolymerizable with the other monomers.

7. A pressure-sensitive adhesive sheet according to claim 6, wherein said cross-linking monomer comprises alkoxy silyl alkyl groups according to the following general formula:

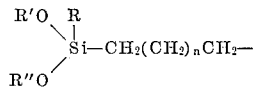

where R' and R'' are either $CH_3-$ or $CH_3CH_2-$, and R is one of the group consisting of $CH_3$—, $CH_3CH_2$—, $CH_3O$— and $CH_3CH_2O$—, and $n$ is a number of 0 through 8.

8. A pressure-sensitive adhesive sheet according to claim 7, wherein said cross-linking monomer is

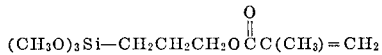

9. A pressure-sensitive adhesive sheet according to claim 7, wherein said adhesive composition includes a small amount of a suitable catalyst for cross-linking said copolymer.

10. A pressure-sensitive adhesive composition which comprises a copolymer of monomers comprising:
(a) a major amount by weight of the copolymer of a medium chain length alkyl acrylate monomer wherein the alcohol moiety comprises an average of about 4–12 carbon atoms, and
(b) about 0.5–5.0 parts of maleic anhydride; and about 0.02–0.5 part of amine nitrogen of a ring-opening amine modifier selected from the group consisting of ammonia, monoamines and polyamines, said amine modifier being added to the composition after the copolymerization of monomers (a) and (b), said parts being parts per 100 parts by weight of total monomer (a) and (b) solids.

11. A pressure-sensitive adhesive composition according to claim 10, wherein said monomers include about 5–30 parts per 100 parts by weight of said monomer solids of a cohesion inducing short chain monomer copolymerizable with the other monomers.

12. A pressure-sensitive adhesive composition according to claim 11, wherein said cohesion inducing short chain monomer is selected from the group consisting of vinyl acetate, methyl acrylate, methyl methacrylate, and short chain acrylamides.

13. A pressure-sensitive adhesive composition according to claim 11, wherein said amine modifier contains no more than one functional group selected from the class consisting of primary amine groups, secondary amine groups and hydroxyl groups.

14. A pressure-sensitive adhesive composition according to claim 10, wherein said monomers include a small amount of a cross-linking monomer having an unsaturated functional terminal group which is copolymerizable with the other monomers.

15. A pressure-sensitive adhesive composition according to claim 14, wherein the unsaturated functional terminal group of said cross-linking monomer is

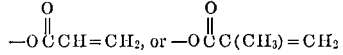

16. A pressure-sensitive adhesive composition according to claim 15, wherein said cross-linking monomer comprises alkoxy silyl alkyl groups according to the following general formula:

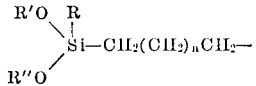

where R' and R" are either $CH_3$— or $CH_3CH_2$—, and R is one of the group consisting of $CH_3$—, $CH_3CH_2$, $CH_3O$— and $CH_3CH_2O$—, and $n$ is a number of 0 through 8.

17. A pressure-sensitive adhesive composition according to claim 16, which comprises an organo-metallic salt catalyst for cross-linking said monomers.

References Cited
UNITED STATES PATENTS
3,371,071   2/1968   Brooks et al. _____ 260—78.5

JOSEPH L. SCHOFER, Primary Examiner

J. KIGHT III, Assistant Examiner

U.S. Cl. X.R.

117—122, 161; 252—431

PC-1050
(5/69)

UNITED STATES PATENT OFFICE
CERTIFICATE OF CORRECTION

Patent No. 3,551,391  Dated December 29, 1970

Inventor(s) Crocker & Doehnert

It is certified that error appears in the above-identified patent and that said Letters Patent are hereby corrected as shown below:

In Column 3, the first formula, that portion reading "$(CH_2)$" should read -- $(CH_3)$ --.

Same Column, the second formula, that portion reading " R"O " should read -- R'O --.

Same Column, the third formula should read

-- $(CH_3O)_3Si-CH_2CH_2CH_2O\overset{O}{\overset{\|}{C}}C(CH_3)=CH_2$

SIGNED AND
SEALED
MAR 9 1971

(SEAL)
Attest:

Edward M. Fletcher, Jr.
Attesting Officer

WILLIAM R. SCHUYLE
Commissioner of Pa